Dec. 9, 1924.　　　　　　　　　　　　　　　　　　1,519,033
A. H. KRUEGER
EXTENSIBLE TRACTOR CONTROLLING MECHANISM
Filed May 27, 1922　　　2 Sheets-Sheet 2
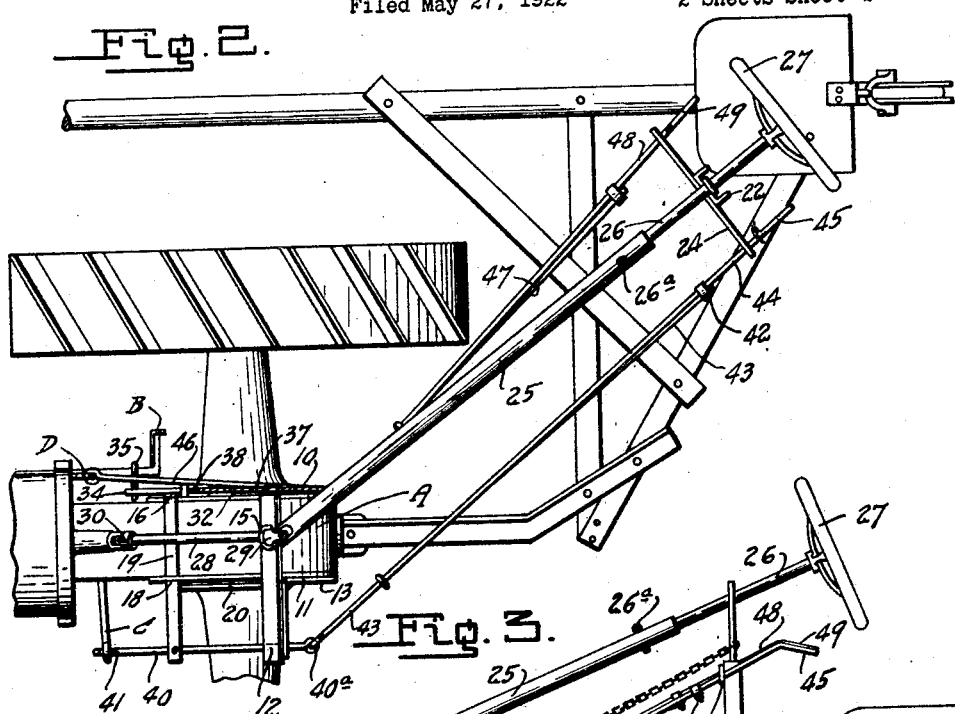
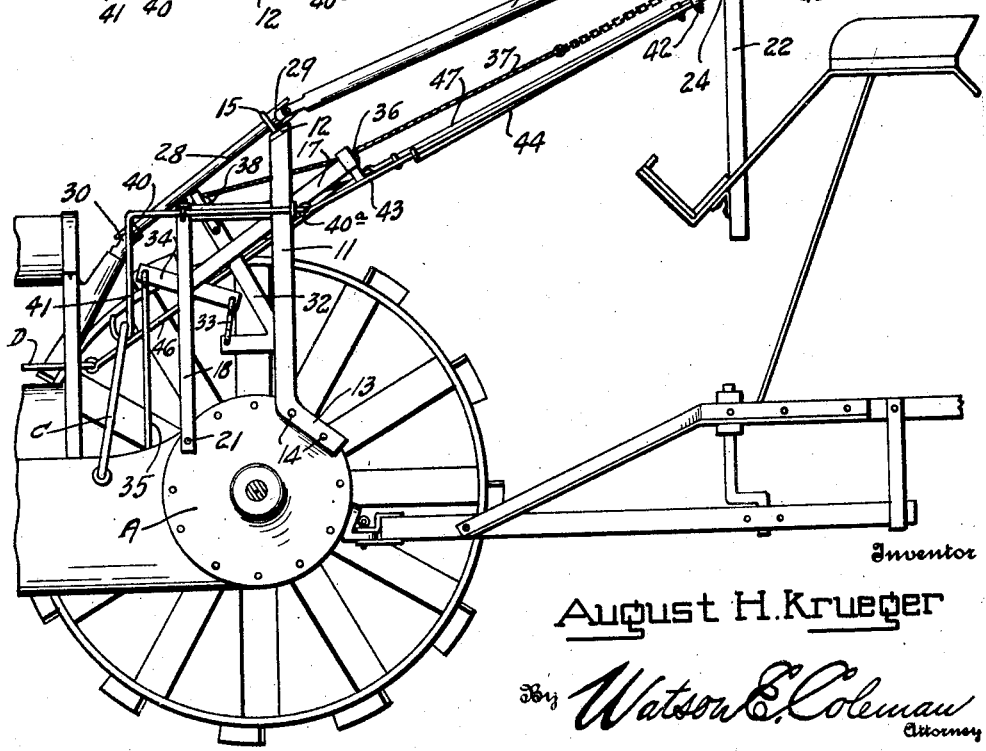
Inventor
August H. Krueger
By Watson E. Coleman
Attorney Patented Dec. 9, 1924.

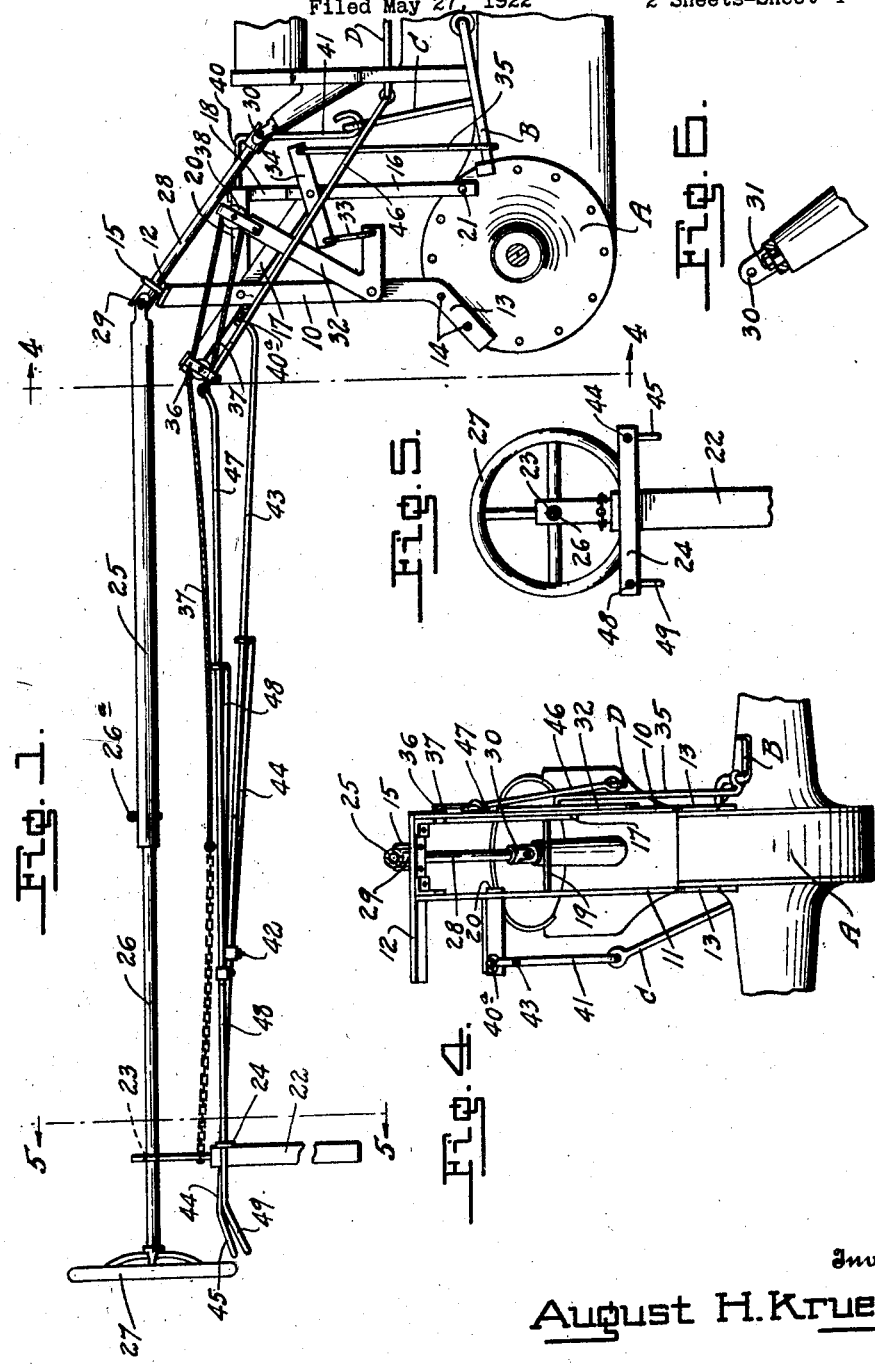

1,519,033

UNITED STATES PATENT OFFICE.

AUGUST H. KRUEGER, OF LURAY, KANSAS.

EXTENSIBLE TRACTOR CONTROLLING MECHANISM.

Application filed May 27, 1922. Serial No. 564,061.

*To all whom it may concern:*

Be it known that I, AUGUST H. KRUEGER, a citizen of the United States, residing at Luray, in the county of Russell and State of Kansas, have invented certain new and useful Improvements in Extensible Tractor Controlling Mechanisms, of which the following is a specification, reference being had to the accompanying drawings.

This invention relates to means for controlling tractors as regards the steering of the tractor, the control of the throttle valve, the control of the transmission gearing, etc., and particularly to that class of controlling devices designed to be used in situations where it is required that a single operator on a controlling machine shall control the tractor for drawing that machine.

The general object of my invention is to provide a controlling attachment particularly adapted to Fordson tractors, though not limited thereto, and so designed that complete control may be had of the Fordson tractor by an operator on the agricultural machine which is being drawn by the tractor, thus doing away with the necessity of there being an operator on the tractor as well as an operator on the agricultural machine.

Another object of this invention is to provide a control attachment of this character which is so designed that it may be used to control a Fordson tractor from a binder, from a drill, from a lister, from a combined harvester and thrasher, or from a header, the controlling mechanism being such that it may be adjusted to suit all these different exigencies of operation and secure a positive control of the steering post or shaft of the tractor, a positive control of the gear shifting lever, a positive control of the throttle lever, and a positive control of the clutch.

A further object is to provide a construction of this character wherein the rear ends of the controlling shafts or controlling members may be disposed in line with either traction wheel of the tractor, while the forward ends are disposed in line with the several instrumentalities to be actuated on the tractor, such a construction permitting the mechanism to be used in connection with a header wherein it is necessary that the operator should be located to one side of the center line of the tractor.

A still further object is to provide a construction of this character having the controlling shafts or rods thereon which operate the steering mechanism, the gear shifting mechanism and the throttle and clutch controlling mechanism telescopic so as to permit the mechanism to be adjusted to suit different distances required between the tractor and the machine which is pushed or pulled thereby.

Other objects will appear in the course of the following description.

My invention is illustrated in the accompanying drawings, wherein:—

Figure 1 is a side elevation of my improved controlling device applied to a tractor, the tractor wheel driving shaft of the tractor being shown in section;

Figure 2 is a fragmentary top plan view of the tractor and a portion of the header, showing my controlling device applied thereto;

Figure 3 is a side elevation of my controlling mechanism applied to a tractor drawing a harvester thrasher;

Figure 4 is a fragmentary rear elevation of the tractor showing the steering device applied thereto;

Figure 5 is an elevation of the supporting means for the rear end of the steering shaft;

Figure 6 is a fragmentary detail view of the steering post of the tractor, showing the manner in which the forward end of the auxiliary steering shaft is applied thereto.

Referring to these drawings, it will be seen that the supporting frame for the forward end of the attachment comprises the two oppositely disposed, laterally spaced, vertical standards 10 and 11 connected at their upper ends by a cross bar 12 and at their lower ends rearwardly and downwardly angled, as at 13, to fit against the base of the differential case and be attached thereto by bolts 14 which hold the ends of the differential case in place. The cross bar 12 carries the medially disposed U-bolt 15.

Forward of the standard 10 is a standard 16 shorter than the standard 10 and connected thereto by an upwardly and rearwardly inclined bar 17. Laterally opposite this standard 16 is a standard 18 which is taller than the standard 16 but not as high as the standard 11 to which the standard 16 is connected by means of a transverse bar 19. This standard 18 is connected to the standard 11 by means of the longitudinally extending bar 20. These parts are all riveted, bolted, or otherwise attached to each other. The standards 16 and 18 are, of course, attached to the tractor at the base of the housing section A by means of bolts 21. Detachably mounted upon the drawn machine in any suitable manner is a supporting standard 22 which at its upper end is formed to provide an eye 23 for the support of a steering shaft and this standard 22 is likewise formed with a cross bar 24 perforated at the ends or otherwise formed for the support of the shafts or rods which shift the transmission gears or shift the throttle lever.

Passing through the eye 23 and supported by the cross bar 12 and held in place upon this cross bar by the bolt 15 is a sectional steering shaft formed of a plurality of sections, certain of the sections having telescopic engagement with each other and certain of the sections having a universal joint connection with each other. I have illustrated this steering shaft as having a main tubular section designated 25. In this is telescopically inserted the rear section 26 which carries the steering wheel 27. This rear section 26 is adjustable through the section 25 and has rotative engagement therewith in any suitable manner, as for instance by providing perforations in the sections 25 and 26 and providing detachable pins 26ª which may be inserted through these perforations when they are in register with each other. Thus the section 26 may be drawn out of the section 25 to any desired extent and then the two sections connected for rotative engagement by the pins 26ª or the section 26 may be telescoped into the section 25 and rotatively connected by the pins. I do not wish to be limited to this particular means for connecting the sections for telescopic and rotative engagement.

The forward end of the section 25 is connected to a relatively short section 28 by a universal joint 29 of any usual or suitable form and the forward end of this section 28 is in turn connected by a flexible or universal joint 30 to a short section 31 to which is adapted to be engaged for rotative movement to the steering post or steering shaft of the Fordson tractor. It will be obvious now that by rotating the wheel 27 that the steering shaft may be rotated, and it will be also obvious that the universal joints 29 and 30 will permit the sections 25 and 26 to be disposed out of line with the steering post and in angular relation thereto, and further that the steering shaft formed of these sections may have the sections disposed directly in alignment or in any angular relation to each other, and yet oscillation of the steering post be secured by oscillation of the steering wheel.

For the purpose of operating the clutch operating pedal of the machine, I mount upon the standard 10 the bell crank lever 32, the long arm of this bell crank lever extending upward and forward, while the short arm extends forward and is connected by a link 33 to a lever 34 pivoted upon the standard 16, the forward end of this lever being connected by a link 35 to the clutch operating pedal B of the tractor. The member 17 extends rearward of the standard 10 and carries upon its rear end a block 36 to which a cable 37 is connected, this cable passing around a pulley 38 on the upper end of the lever 32 and then extending rearward and being connected to a chain or other pull element, this chain or other pull element extending rearward and passing through the cross bar 24 or being adapted to be connected thereto so that when this chain is pulled back the clutch will be released, the chain may be then connected to the cross bar to hold the clutch released, and when the chain is released the clutch will move forward.

For the purpose of operating the gear shifting lever C of the tractor, I provide a shaft formed of a plurality of sections, one of said sections being designated 40 and being mounted in suitable bearings in the standards 11 and 18 at the upper ends of these standards. This section 40 is provided at its ends with a crank 41 having a hook or eye adapted to engage with the eye formed on the usual gear shifting lever C. This section 40 is connected at its rear end by an eye 40ª engaging an eye on end of a shaft or rod section 43 which carries at its end a clamp 42 engaged with a third section 44. This section 44 passes through the cross bar 24 and is formed with an angularly bent terminal end 45. This construction permits the sections 40, 43 and 44 to be adjusted toward or from each other but at the same time for rotative engagement with each other.

The throttle rod D of the machine which is oscillated to open and close or otherwise control the throttle of the engine is operated also by an operating rod or shaft composed of a series of sections having telescopic rotative engagement with each other. As illustrated, it consists of a section 46 whose forward end is adapted to be connected to the throttle rod D, while its rear end is rotatively mounted in the frame of the block 36 and has a universal joint connection to a section 47 which has telescopic engagement with a section 48, means being provided for binding these sections together so that even though they have telescopic adjustment they may have rotative engagement at all times, this means consisting of a clamp such as the clamp 42 previously described. The rear ends of the sections are bent, as at 49, to provide a crank handle whereby this throttle controlling shaft made up of these sections may be rotated. The shaft made up of the sections 40, 41, 43, 44 and 45 and the shafts made up of the sections 46, 47, 48 and 49 are mounted at their rear ends on the cross bar 24.

With the construction described, it is possible to fully control the operation of a tractor, particularly a Fordson tractor, from a large number of agricultural machines and designed to be drawn by the tractor and this dispenses with the use of an operator on the tractor itself. The construction permits of a very wide range of adjustment for the various parts of the attachment so as to fit it for use with various agricultural machines. The rods or shafts may be drawn out or extended as desired.

I have illustrated an application of this device to a harvester thrasher and to a header, the harvester thrasher and header being shown as connected to the tractor by means of a peculiar hitch forming the subject matter of another application to be filed by me and not forming any part of this invention. In actual practice the controlling device may be shortened so as to have a length of approximately 6′ or be extended to have a length of approximately 16′. Where the steering device is used on a tractor and header such as shown in Figure 2, the steering device has to be so arranged as to steer the tractor from a point in line with one side of the tractor. This is impossible with any other controlling or steering device on the market and known to me. Where the device is to be applied to a harvester thrasher, the steering wheel and the ends of the controlling shafts must be disposed much higher than the tractor, whereas in many other machines the steering mechanism is disposed practically on a level but the controlling mechanism must be increased in length. Where the device is used with a combined harvester thrasher, the controlling mechanism must be reduced in length, as this only requires a very short controlling mechanism or about 7′ in length. Where the controlling mechanism is used with a wheat drill, however, a length of 10′ is required and nearly on the level. With a corn binder, the controlling mechanism must be reduced to 6′ and in that case the rear end of the controlling mechanism is disposed much lower than that end of the controlling mechanism which is connected to the tractor. A wheat binder requires that the controlling mechanism be adjusted to a length of about 16′ and with the rear end of the controlling mechanism much higher than the forward end of the controlling mechanism. A riding lister requires that the controlling mechanism be adjusted to a length of from 8 to 12′ and when connected disposed nearly in a horizontal plane. A mowing machine requires a controlling mechanism of only about 6′ and with the steering wheel of the controlling mechanism disposed much below the position of the steering wheel on the tractor. Thus all different agricultural machines require that the controlling mechanism be disposed at different angles and this necessitates that the throttle, gear shifter and clutch shifter steering mechanism of my improvement must be so arranged that they must be operated at an angle. I have only illustrated two applications of this controlling mechanism to agricultural machines, but it is adapted for use in many more cases than I have above stated.

While I have illustrated details of construction which I have found in practice to be particularly desirable, I do not wish to be limited thereto, as it is obvious that many changes might be made in these details without departing in any way from the spirit of the invention as embodied in the appended claim.

I claim:—

A controlling mechanism for the clutch of a tractor comprising a supporting frame adapted to be mounted upon the tractor, a support adapted to be mounted upon an implement drawn by the tractor and extending upward therefrom, a lever mounted upon the forward supporting frame and having a link adapted to engage the clutch pedal of the tractor, a bell crank lever operatively mounted upon the forward supporting frame and having a link connection to one end of said lever, a flexible member operatively connected at one end to the supporting frame, and a pulley mounted upon the free end of said bell crank lever and around which pulley the flexible member passes, said flexible member then extending rearward and being operatively supported by the rear supporting frame, there being means on the rear supporting member for engaging the flexible member and holding it in a retracted position.

In testimony whereof I hereunto affix my signature.

AUGUST H. KRUEGER.